United States Patent Office 3,718,583
Patented Feb. 27, 1973

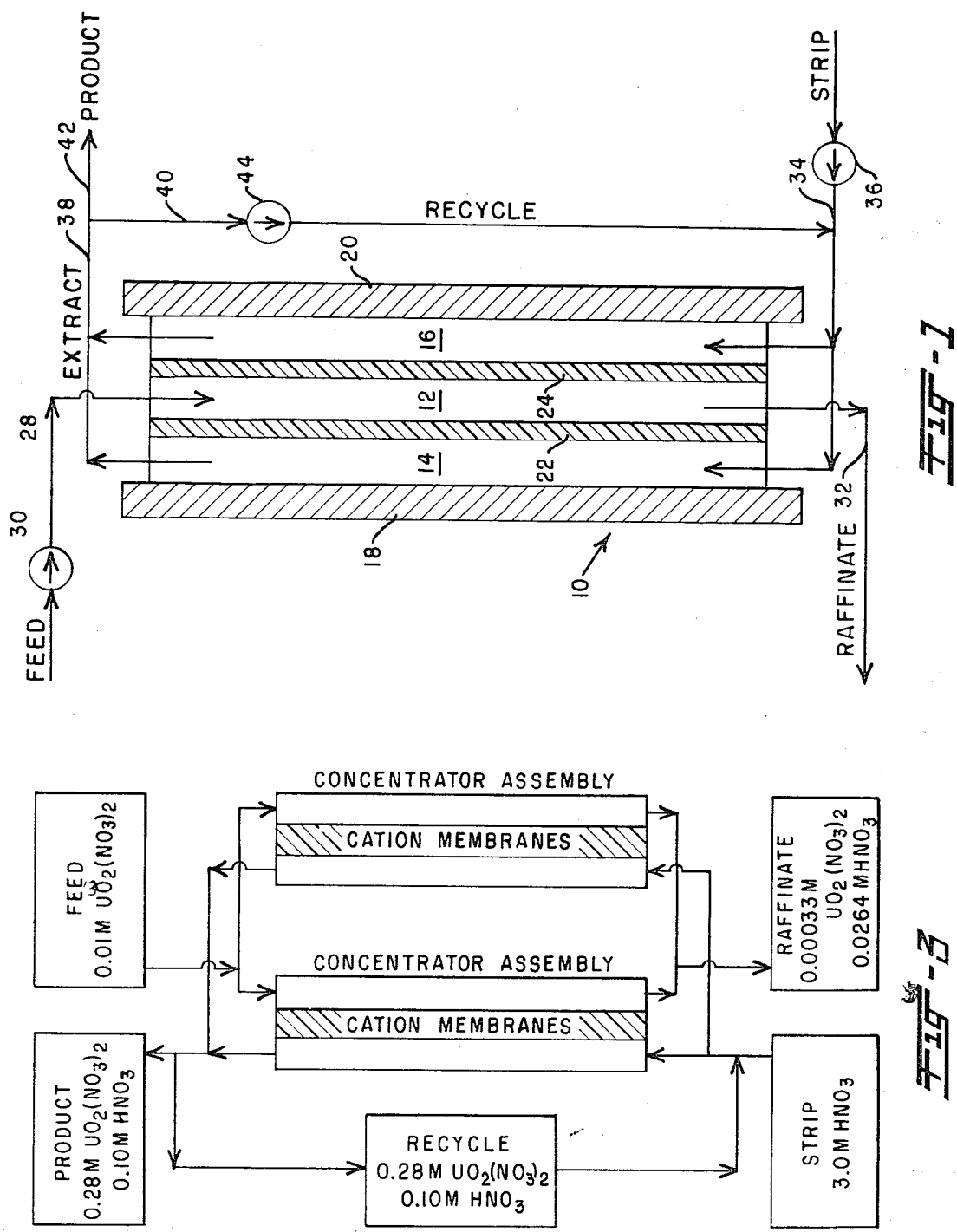

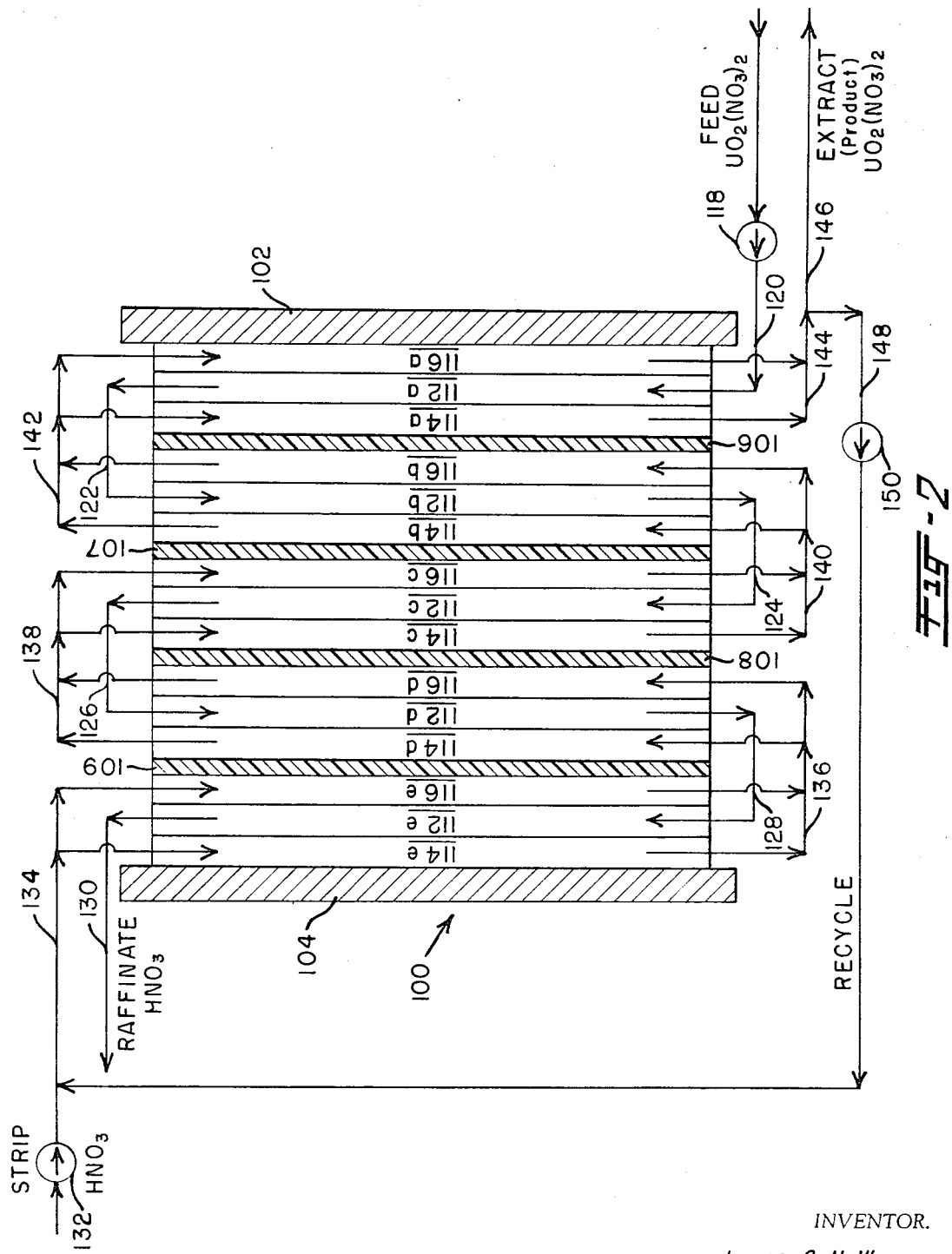

3,718,583
METHOD FOR THE CONCENTRATION OF HEAVY METAL CATIONS USING ION SELECTIVE MEMBRANES
James S. H. Wu, Grifton, N.C., and Broughton L. Baker, Columbia, S.C., assignors to the United States of America as represented by the United States Atomic Energy Commission
Continuation of abandoned application Ser. No. 18,579, Mar. 11, 1970. This application Nov. 29, 1971, Ser. No. 203,038
Int. Cl. B01d *13/00*
U.S. Cl. 210—22       1 Claim

ABSTRACT OF THE DISCLOSURE

The concentration of heavy metal cations, such as uranyl or plutonium cations, from ionic solutions separated by an ion selective membrane, wherein the difference in chemical potentials of the various ion species provide the driving force to effect a transfer across the membrane, is enhanced by separating a portion of the extract solution being concentrated in heavy metal cation product and recirculating that portion along with the initial strip solution into contact with the membrane. The preferred ratio of the recirculating portion to the initial strip solution is between about 1 to 1 and 5 to 1.

This application is a continuation of Ser. No. 18,579, filed Mar. 11, 1970, and now abandoned.

BACKGROUND OF THE INVENTION

The invention described herein was made in the course of, or under, a contract with the U.S. Atomic Energy Commission.

This invention relates to a method for the concentration of heavy metal cations in aqueous solutions and more particularly to an improved continuous method for the concentration and recovery of heavy metal cations in aqueous solutions using an ion selecitve membrane system.

Heavy metal cations, in particular cations of actinides and lanthanides, heretofore have been concentrated, separated and recovered from aqueous solutions containing small quantities of these cations in ion selective membrane systems wherein the driving force for the concentration is provided by the difference in chemical potentials of the various ion species in the respective solutions on each side of the membrane. This concentration has been successfully accomplished without the use of an applied electrical potential across the membrane. Particular embodiments of a successful ion selective membrane concentration method, including the concentration and separation of actinides and lanthanides, are described in detail in assignee's U.S. Pat. 3,454,490 granted to Richard M. Wallace on July 8, 1969. This patent describes a method wherein ion species in aqueous solutions are selectively concentrated and separated by contacting a first aqueous solution containing the first ion species that is to be concentrated with one side of an ion selective membrane having polar selective permeability for the desired ion species while simultaneously contacting a second aqueous solution containing a second ion species having the same polarity as the first ion species with the opposite side of the membrane. The compositions of both solutions are controlled to maintain a difference in the chemical potentials of the ion species and these solutions are maintained in contact with their respective side of the membrane for sufficient time to produce the transfer of a substantial portion of the first ion species and a portion of the second ion species through the membrane whereby the first ion species is concentrated in the second aqueous solution. The desired first ion species is then recovered from the second solution by conventional separation means. This process is particularly useful and efficient for concentration, separation and recovery of heavy metal cations, such as uranyl ions, strontium ions, lanthanum ions and other valuable heavy metal cations which heretofore have been separated by conventional ion exchange resin techniques. The control of this separation method using difference in chemical potentials of the various ions across the membrane is accomplished by maintaining a difference in charge on the ions, by the use of complexing agents on opposite sides of the membrane, or by a difference in the ionic activities in the respective solutions.

Although the method described in the above cited Wallace patent has been very successful for the separation and recovery of heavy metal cations, it has been recognized by those skilled in the art that one of the difficulties inherent in this process is that the diffusion of water across the membrane by osmotic pressure tends to dilute the concentrating solution (strip) and thereby diminish the concentration of the desired cations. Some of the difficulty of diffusion of water by osmotic pressure can be overcome to a limited extent by careful selection of a membrane that will minimize this osmotic effect. In addition, the effects of osmotic pressure can be partially controlled by careful continuous control of the chemical potentials (partial molar free energies of the various ions) of the solutions and by maintaining a suitable solution contact time with the membrane. However, none of these attempts to control the osmotic pressure across the membrane have been sufficient to substantially reduce the detrimental effects of osmotic pressure. Also, it will be seen from the foregoing that considerable difficulty is inherent in the number of controls required to effect a suitable concentration in spite of the osmosis through the membrane.

SUMMARY OF THE INVENTION

Accordingly, it is an object of the present invention to provide an improved method for the concentration and separation of heavy metal ions in aqueous solutions using ion selective membranes. It is still another object to provide a method of suppressing the inherent osmotic diffusion of water across cation selective membranes for the improved concentration and separation of heavy metal cations from aqueous solutions.

These and other objects are accomplished in the present invention by removing from the ion selective membrane separation system a portion of the solution being concentrated in heavy metal cations (extract solution) and recirculating or recycling that portion of the extract solution into contact with the membrane. It has been found that recirculating a portion of the solution that is being concentrated in heavy metal cations (extract) (i.e. returning it to the initial strip solution) tends to suppress the osmotic diffusion of water across the membrane thereby increasing the concentration of the heavy metal cations in the strip solution without increasing the loss of heavy metal cations to the raffinate. Thus, in a method for the concentration and recovery of heavy metal cations using an ion selective membrane which includes continuously contacting an aqueous feed solution containing the heavy metal cations with one side of the cation selective membrane and countercurrently contacting an aqueous strip solution with the opposite side of the membrane to effect a transfer and concentration of heavy metal cations in the strip solution, separating a portion of the solution that is being concentrated in heavy metal cations and recirculating that portion into contact with the membrane tends to suppress the osmotic diffusion of water across the membrane.

It will be apparent that this recirculation or recycle of a portion of the extract stream is different from a conventional reflux operation to enhance the concentration in a chemical process system because the present recycle returns some of the extract to the initial strip solution rather than to an enriched stream. The present process is particularly surprising because it is the converse of conventional reflux in that a portion of an enriched stream is returned to a dilute stream.

Although this invention is not to be understood as limited to a particular theory, the reduction in osmotic flow across the membrane may be caused by the substantial conversion of the membrane to the heavy metal cation form over its entire length. It is known that membrane in the hydrogen form swells more than in the uranyl form, thereby providing larger pores that can permit more transfer of water across the membrane with less resistance. It is believed that by providing more heavy metal cations in the strip solution the membrane is maintained in the heavy metal cation state and the effect is to suppress the transfer of water across the membrane.

Suppression of the inherent osmosis of the membrane using this method results in a significantly enhanced concentration of heavy metal cations without an increased loss of these same desired cations to the raffinate solution. The method has been found to be particularly useful for the separation of heavy metal cations, such as actinide and lanthanide cations. Also, it has been found that a suitable ratio of the recirculating portion to the initial strip solution is between about 1 to 1 and 5 to 1.

At least three significant advantages result from this recirculation: (1) Better mixing of the solutions in the stripper solution, (2) avoidance of high acid concentration differences between the raffinate and the stripper stream, and (3) maintenance of the entire membrane length in the most suitable cation form for efficient concentration.

This invention will be more fully understood by reference to the following detailed description of a preferred embodiment taken in conjunction with the appended drawings.

BRIEF DESCRIPTION OF DRAWINGS

FIG. 1 is a schematic cross-section of a single pass countercurrent cation selective membrane concentrator using three membranes to form one feed channel between two strip channels with recycle of a portion of the extract stream.

FIG. 2 is a schematic cross-section of a multiple pass countercurrent cation membrane concentrator assembly made up of five concentrators of the type shown in FIG. 1 for the concentration of uranyl ions from aqueous solutions. This embodiment also provides for recycle of a portion of the extract stream.

FIG. 3 is a schematic flow sheet of one typical method of adapting multiple pass cation membrane assemblies into a continuous concentration system for the economic recovery of the uranyl ions in nitrate solutions.

DESCRIPTION OF THE PREFERRED EMBODIMENT

The cation selective membrane concentrator shown in FIG. 1 is a parallel flow countercurrent concentrator that schematically illustrates the single pass countercurrent concentration of cations in aqueous solutions. The concentrator 10, which is arranged similar to conventional membrane systems, in stacks or cells, comprises a single feed channel 12 between adjacent strip channels 14 and 16. The respective feed and strip channels are physically separated by semipermeable membranes 22 and 24 consisting of suitable cation selective membrane material having cation selective permeability for the cation species to be concentrated. The channels 12, 14 and 16 with the membranes 22 and 24 are assembled between two end plates 18 and 20 with suitable spacers and membrane supports. Although suitable spacers and membrane supports will be familiar to those skilled in the art, it has been found that satisfactory membrane support is provided by a stainless steel screen disposed between each channel. The stainless steel screen prevents sticking and collapse of a membrane due to the thin channel thickness and pressure difference between the two sides of the screens. Cation selective membranes that can be satisfactorily employed in the concentrator of FIG. 1 will be described hereinafter. Feed and strip stream input and outlet means are provided at each end of the concentrator for feed and strip solution flow into the respective channels. Feed solution input is provided into feed channel 12 by feed inlet means 28 and the flow is controlled by feed metering pump 30. After passing through channel 12 the depleted feed solution emerges through raffinate outlet means 32. Strip solution is introduced through strip inlet means 34 and the strip solution flow is controlled by strip metering pump 36. After flowing through strip channels 14 and 16, the extract emerges through extract outlet means 38. To provide for a recirculation or recycle flow, the extract is divided into product stream 42 and recycle stream 40. The recycle flow 40 is controlled by a recycle metering pump 44. The recycle is returned to the initial strip inlet means 34 to be combined with the strip solution.

It will be apparent to those skilled in the art that, instead of a single pass countercurrent flow of feed and strip solutions, a multiple pass countercurrent arrangement will provide a more economical and efficient concentration of ions. Such an arrangement is illustrated in FIG. 2 which shows the schematic cross-section of a multiple pass cation exchange membrane concentrator assembly for the concentration of the uranyl ions from aqueous nitrate solution. The cation selective membrane concentrator assembly 100 of FIG. 2 comprises five compartments each divided into three channels, one feed channel 112 and two strip channels 114 and 116. Each concentrator compartment is separated from the adjacent compartment by suitable partitions 106, 107, 108 and 109. The stack of membrane compartments and partitions is also arranged and disposed in conventional manner in a suitable frame between a pair of end plates 102 and 104. Each of the channels is provided with a suitable inlet and outlet means and each compartment is interconnected, as illustrated, for continuous solution flow through each of the feed and strip compartments, respectively. Feed solution inlet is provided through feed metering pump 118 and feed inlet means 120. Feed solution then passes through channel 112a to channel 112b through conduit 122, from channel 112b to channel 112c through conduit 124, from channel 112c to channel 112d through conduit 126, from channel 112d to channel 112e through conduit 128, and the depleted feed solution finally emerges through raffinate outlet means 130. Strip solution is introduced countercurrent to the feed solution through strip solution metering pump 132 and strip inlet means 134 into channels 114e and 116e, and passes through the respective strip manifolds 136, 138, 140 and 142 until it passes through channels 114a and 116a and emerges as extract at extract outlet means 144. As in FIG. 1, the extract at this point is divided into a product stream 146 and a recycle stream 148. The flow of recycle stream 148 is controlled by recycle metering pump 150 and returned to the initial strip inlet means 134 for recycle through the stripping system.

Although FIG. 2 shows for exemplary purposes a five compartment multiple pass arrangement, those skilled in the art will recognize that any number of compartments or stages can be used and countercurrent or cocurrent arrangements can be used to achieve optimum operation and efficient concentration of the cation species being separated. Also, two adjacent compartments can serve as a stage or multicompartment units such as those shown in U.S. Pat. 3,454,490, hereinabove cited, can be employed.

FIG. 3, which shows a schematic flow sheet for adapting a plurality of concentrator assemblies into a continuous concentration system for the economic recovery of uranyl ions, will be described in more detail in connection with Example II.

Although the choice of cation selective membrane material for use in the present method is not critical, a number of membrane properties should be considered to achieve efficient concentration and separation of cation species. First, the membrane must have a high cation selectivity by permitting preferential diffusion of the cations to be concentrated while at the same time excluding ions of opposite polarity. In addition to high ion selectivity, the membrane should have good chemical stability to resist hydrolytic degradation and oxidative breakdown, good radiolytic stability to resist degradation when used in contact with radioactive solutions, and good mechanical and structural integrity to withstand fluid flow and pressure. A wide variety of cation selective membranes of types well known in the art may be satisfactorily employed in the method of the present invention. However, membranes that have been found to be particularly effective when employing the solutions hereinafter described in the examples are those membranes prepared by copolymerization processes. In these processes, hydrophobic films, such as polyethylene and polychlorotrifluoroethylene, are impregnated with styrene or styrene-divinylbenzene mixtures and are then polymerized by chemical means or by exposure to gamma radiation from a cobalt-60 source. Copolymerization of the styrene and divinylbenzene into the film base provides a suitable membrane base. To obtain a strong acid cation selective membrane the polymerized membrane is then sulfonated by well known conventional means. Strong acid cation selective membranes prepared by this process are between about 0.15 and 0.30 mm. in thickness and have dry cation exchange capacities between about 0.6 and 1.6 meq./g. Detailed descriptions of suitable membranes, including methods of their preparation, are thoroughly disclosed in U.S. Pats. 3,247,133; 3,257,334 and 3,113,889. Other references include Kirk-Othmer Encyclopedia of Chemical Technology, 2nd ed., vol. 7, pp. 847–849, Interscience Publishers (1965); Helfferich, F., Ion Exchange, pp. 61–65, 339–416 and 583, McGraw-Hill Book Co., Inc., New York (1962).

Membranes prepared as hereinabove described are available commercially from the American Machine and Foundry Company, New York, New York under the trade name "AMFion." Suitable strong acid cation membranes are AMFion C-60, AMFion C-103 and AMFion C-113. In the examples hereinafter presented "strong acid cation selective membrane" refers to a membrane that has a polyethylene-styrene matrix with sulfonic acid ionic groups that is prepared by a polymerization process, such as the membrane available commercially under the designation "AMFion C-103."

Utilizing the apparatus hereinabove described, if a dilute feed solution of a salt of a cation to be concentrated and a noncomplexing anion is introduced into the membrane assembly into contact with one side of the cation selective membrane and a concentrated strip solution of an acid or salt of another cation having the same anion is supplied to the assembly and into contact with the opposite side of the membrane, the cation originally in the dilute solution diffuses through the membrane and concentrates in the more concentrated solution. The condition for equilibrium for such a system may be based on Donnan membrane theory wherein:

$$\left(\frac{C_{1R}}{C_{1L}}\right)^{Z_2} = \left(\frac{C_{2R}}{C_{2L}}\right)^{Z_1}$$

where $C_{1R}$ and $C_{1L}$ are activities (approximately the concentration) of the first cation on the right and left sides of the membrane respectively, $C_{2R}$ and $C_{2L}$ are the same quantities for the second cation while $Z_1$ and $Z_2$ are the respective charges on the first and second cation. Therefore, ions of higher charge are concentrated preferentially over ions of lower charge. Thus, if the dilute and concentrated solutions flow countercurrent to each other in alternate compartments of the membrane assembly with the concentrated solution allowed to flow at a much slower rate than the dilute solution, a high concentration of the ion originally in the dilute solution can be achieved with a nearly complete removal of said ions from the dilute solution.

As previously noted, one of the inherent difficulties in this process is the diffusion of water across the membrane by osmotic pressure. This osmosis tends to dilute the solution being concentrated in desired product and thereby diminish the concentration of the desired cations. The amount of water passing through the membrane due to osmotic flow can dilute, as much as by a factor of two, the initial stripping solution depending upon the concentration level of the acid. As would be expected, high concentration gives high osmosis. Therefore, this dilution of the product becomes one of the major problems in the membrane concentration process. However, it has been found that this osmotic flux can be significantly suppressed by recirculating or recycling a portion of the concentrated extract to the initial strip stream, so that the stripping solution will have a certain concentration of the product cations (uranyl ions in the examples) instead of just pure acid. Thus, recycling this portion of the extract will tend to decrease the osmosis and in turn increase the product concentration without undue loss to the raffinate stream.

The present method can best be understood by reference to the following typical and representative example wherein the method of the present invention will be described primarily with respect to the concentration of uranyl ions in aqueous solutions. Another example will illustrate a continuous concentration system for the economic recovery of the uranyl ions from nitrate solutions as shown in the schematic flow sheet of FIG. 3.

EXAMPLE I

Multiple pass membrane concentration of uranyl nitrate

A multiple pass cation selective membrane concentrator was assembled from five compartments, each having three flow channels as hereinabove shown in FIG. 2. A series folded arrangement provided a total of five feed channels each disposed between ten countercurrent flow strip channels. Each compartment contains two strong acid cation selective membranes 20 inches long and 4 inches wide disposed to form channels fifteen mils thick using a 12 mil screen for support. This provided a total effective feed channel length of 100 inches. The total membrane area exposed to feed solution was 800 square inches. Synthetic feed solutions containing 0.01 mole per liter uranyl nitrate were fed through feed channels of the membrane assembly at the flow rates indicated in the following Table I. The feed rates were maintained by a controlled volume pump. Feed agitation was not required because of the narrow channel thickness between the membranes.

A strip solution containing 3.0 moles per liter of nitric acid was fed into the strip channels adjacent each feed channel at the flow rates set forth in Table I. Each run was continued for a sufficient time to attain steady state at room temperature. The results of these runs are shown in the following Table I:

TABLE I

Multiple pass membrane concentration of uranyl nitrate
[Feed solution: 0.01 M $UO_2(NO_3)_2$; Strip solution: 3.0 M $HNO_3$]

| Run No. | Flow rate, ml./hour feed | Strip | $\theta$ a | $\alpha$ b | Analysis, M | | | | Osmosis moles in.², hr. |
|---|---|---|---|---|---|---|---|---|---|
| | | | | | Product $UO_2^{++}$ | Raffinate $UO_2^{++}$ | Product $H^+$ | Raffinate $H^+$ | |
| 1 | 1,698 | 18.3 | 0.0 | 1.62 | 0.251 | $4.69 \times 10^{-4}$ | 0.108 | $2.87 \times 10^{-2}$ | $3.34 \times 10^{-3}$ |
| 2 | 1,698 | 18.4 | 0.0 | 1.62 | 0.244 | $4.37 \times 10^{-4}$ | 0.121 | $2.55 \times 10^{-2}$ | $3.37 \times 10^{-3}$ |
| 3 | 1,691 | 16.1 | 1.0 | 1.43 | 0.300 | $6.18 \times 10^{-4}$ | 0.048 | $2.76 \times 10^{-2}$ | $2.51 \times 10^{-3}$ |
| 4 | 1,689 | 16.0 | 1.0 | 1.42 | 0.304 | $5.80 \times 10^{-4}$ | 0.058 | $2.69 \times 10^{-2}$ | $2.56 \times 10^{-3}$ |
| 5 | 1,669 | 16.3 | 2.0 | 1.47 | 0.317 | $3.97 \times 10^{-4}$ | 0.088 | $2.71 \times 10^{-2}$ | $2.47 \times 10^{-3}$ |
| 6 | 1,678 | 16.3 | 2.0 | 1.46 | 0.322 | $4.50 \times 10^{-4}$ | 0.079 | $2.61 \times 10^{-2}$ | $2.50 \times 10^{-3}$ |
| 7 | 1,664 | 16.3 | 3.0 | 1.47 | 0.314 | $4.30 \times 10^{-4}$ | 0.106 | $2.66 \times 10^{-2}$ | $2.38 \times 10^{-3}$ |
| 8 | 1,664 | 16.8 | 3.0 | 1.52 | 0.313 | $3.50 \times 10^{-4}$ | 0.118 | $2.65 \times 10^{-2}$ | $2.38 \times 10^{-3}$ |
| 9 | 1,681 | 16.1 | 3.0 | 1.44 | 0.318 | $3.87 \times 10^{-4}$ | 0.096 | $2.69 \times 10^{-2}$ | $2.40 \times 10^{-3}$ |
| 10 | 1,676 | 18.4 | 3.0 | 1.65 | 0.2860 | $2.56 \times 10^{-4}$ | 0.185 | $2.78 \times 10^{-2}$ | $2.61 \times 10^{-3}$ | a $\theta$ = The ratio of the flow rate of the recycling extract solution to the flow rate of the make-up strip solution.
b $\alpha$ = Equivalents of hydrogen ion per unit of time entering in the strip/equivalents of uranyl ion per unit of time in the feed.

Runs 1 and 2 were made without any recycle of the extract stream and subsequent runs (3 to 10) were made with increasing recycle of a portion of the extract stream to the initial strip stream to determine the effect of the recycle on product recovery and osmotic flux across the membrane. The amount of recycle entering the strip channels is in addition to the initial amount of strip solution. Table I shows that with increasing recycle there is a significant decrease in osmosis across the membrane while at the same time uranyl ion product concentration is significantly enhanced. This suppression of osmotic diffusion of water across the membrane and improved recovery of uranyl ion can be accomplished while maintaining a low uranyl concentration in the raffinate. Runs 7 and 8 in particular with a recycle ratio of $\theta=3.0$ have a very high uranyl ion product concentration and low uranyl ion loss to the raffinate.

In general any amount of recycle from a ratio of about $\theta=1$ will result in a suppression of osmotic flux across the membrane and those skilled in the art will recognize that the value of $\theta$ can be increased to a value as high as would economically be feasible. Increasing the recycle ratio above a value of about $\theta=5$ does not increase the concentration efficiency.

The ratio $\alpha$, defined in Table I, is a useful operating parameter for membrane concentration of uranium because it is a measure of the stoichiometric saturation of the product solution with respect to uranium when all of the uranium is removed from the feed solution. Thus, the value of the ratio $\alpha$ is an index to the approach to conditions that will yield maximum concentration. In general, optimum stoichiometric saturation of the product solution with respect to uranium for this system is obtained by maintaining the ratio $\alpha$ in the range of from about $\alpha=1.45$ to $\alpha=1.50$.

A continuous process for the economic concentration and recovery of the uranyl ions, including the recycle of a portion of the extract stream, is shown schematically in FIG. 3. This system comprises two identical multiple pass countercurrent membrane concentrators arranged in parallel. Each concentrator has 103 square feet of exposed strong acid cation selective membrane for a total membrane concentration area of 206 square feet. Positive displacement, reciprocating pumps (not shown) are used to supply the feed, strip and recycle solutions. The amount of the solutions flowing into the channels is controlled by adjusting the piston stroke. A concentration of uranyl nitrate using the flow sheet of FIG. 3 is described in the following Example II:

EXAMPLE II

Continuous concentration of uranyl nitrate using recycle system

A synthetic feed solution containing 0.01 M $UO_2(NO_3)_2$ is fed into the feed channels of the parallel membrane concentrators shown in FIG. 3 at a flow rate of 1470.0 liters per day. AMFion C–103 membrane is used to provide the 206 square feet of cation selective membrane area arranged in a manner hereinabove described in FIG. 2 with a channel spacing of 15 mils. Three molar nitric acid is fed into the strip channels at a flow rate of 14.50 liters per day. The ratio $\alpha$ is maintained at approximately 1.48 and the amount of recycling solution is three times the flow of makeup strip acid (i.e., $\theta=3$). The extract stream, which contains approximately 0.28 molar uranyl nitrate and 0.10 molar nitric acid, is recycled at a flow rate of 43.50 liters per day. Product solution containing the same concentration as the extract is recovered at 50.70 liters per day. The raffinate (flow rate=1434.2 liters per day) contains a concentration of uranyl nitrate amounting to only 0.00033 molar $UO_2(NO_3)_2$. The component concentrations for each stream of this example are shown in FIG. 3. This example shows that an excellent recovery of uranyl nitrate can be obtained using the recycle system with very little loss of product to the raffinate. Approximately 3.5 kg. of uranium in the form of uranyl nitrate per day is concentrated and recovered using this system.

Although the instant invention has been discussed primarily with regard to the concentration and recovery of several specific heavy metal cations, it will be apparent to those skilled in the art that the present method is broadly applicable to the concentration of other ions, including anions, that have heretofore been concentrated by conventional ion exchange technique. For instance, fluoride complexes of plutonium may be amenable to concentration by this method.

What is claimed is:

1. In the method for the concentration and recovery of uranyl values which includes continuously passing an aqueous solution containing said uranyl values into contact with one side of a strong acid cation selective membrane, simultaneously countercurrently passing a nitric acid strip solution into contact with the opposite side of said membrane, and controlling the compositions of said solutions to continuously maintain differences in the chemical potentials of the ions in said solutions and maintaining said solutions in contact with said membrane for sufficient time to effect a concentration of said uranyl values into said strip solution to form an extract solution, the improvement which comprises separating a portion of said extract solution being concentrated in said uranyl values, recirculating said portion into contact with said membrane, the ratio of said recirculating portion to the initial strip solution being about 3 to 1, and maintaining said contact for sufficient time to substantially convert said membrane, throughout its entire length, to the uranyl form to suppress the osmotic diffusion of water across said membrane, to enhance the concentration of said uranyl values, and to decrease the loss of said uranyl values to the raffinate.

References Cited

UNITED STATES PATENTS

| | | | |
|---|---|---|---|
| 3,577,331 | 5/1971 | Lacey et al. | 210—321 X |
| 3,310,481 | 3/1967 | Mock et al. | 204—180 P |
| 3,454,490 | 7/1969 | Wallace | 210—22 |

REUBEN FRIEDMAN, Primary Examiner

R. BARNES, Assistant Examiner